US012044295B2

(12) United States Patent
Groll

(10) Patent No.: US 12,044,295 B2
(45) Date of Patent: Jul. 23, 2024

(54) LINEAR ACTUATOR AND MANUFACTURING METHOD

(71) Applicant: Ewellix AB, Gothenburg (SE)

(72) Inventor: Arnaud Groll, Chambery (FR)

(73) Assignee: Ewellix AB, Gothenburg (SE)

( * ) Notice: Subject to any disclaimer, the term of this patent is extended or adjusted under 35 U.S.C. 154(b) by 0 days.

(21) Appl. No.: 18/151,806

(22) Filed: Jan. 9, 2023

(65) Prior Publication Data

US 2023/0220907 A1    Jul. 13, 2023

(30) Foreign Application Priority Data

Jan. 13, 2022  (DE) ............... 10 2022 100 770.7

(51) Int. Cl.
F16H 25/20 (2006.01)
F16H 25/22 (2006.01)

(52) U.S. Cl.
CPC ............... *F16H 25/2252* (2013.01)

(58) Field of Classification Search
CPC .. F16H 25/2252; F16H 1/2818; F16H 1/2827; F16H 1/2836; F16H 13/08; F16H 15/503; F16H 25/224
See application file for complete search history.

(56) References Cited

U.S. PATENT DOCUMENTS

| | | | |
|---|---|---|---|
| 9,546,718 B2 | 1/2017 | Buvril et al. | |
| 2006/0266146 A1* | 11/2006 | Waide | H02K 7/102 74/424.92 |
| 2014/0165754 A1* | 6/2014 | Buvril | F16H 25/2252 74/424.71 |
| 2016/0226337 A1* | 8/2016 | Rudy | F16H 25/2252 |
| 2019/0234498 A1 | 8/2019 | Johnson et al. | |
| 2020/0182338 A1* | 6/2020 | Groll | F16H 25/2252 |

FOREIGN PATENT DOCUMENTS

| | | |
|---|---|---|
| DE | 202013105526 U1 | 3/2014 |
| DE | 102015214246 A1 | 2/2017 |
| WO | 2016000719 A1 | 1/2016 |

* cited by examiner

*Primary Examiner* — Zakaria Elahmadi
(74) *Attorney, Agent, or Firm* — Laurence A. Greenberg; Werner H. Stemer; Ralph E. Locher

(57) ABSTRACT

A linear actuator includes a roller screw nut, a roller screw shaft and a plurality of planetary rollers forming an inverted roller screw mechanism. A bearing supports a rotating part of the linear actuator. The bearing includes a mounting member and a plurality of bearing rollers engaging a first bearing portion of the mounting member and a second bearing portion of the rotating part. The plurality of bearing rollers is axially fixed relative to the rotating part and the mounting member. A manufacturing method for the linear actuator is also provided.

17 Claims, 2 Drawing Sheets

LINEAR ACTUATOR AND MANUFACTURING METHOD

CROSS-REFERENCE TO RELATED APPLICATION

This application claims the priority, under 35 U.S.C. § 119, of German Patent Application DE 10 2022 100 770.7, filed Jan. 13, 2022; the prior application is herewith incorporated by reference in its entirety.

FIELD AND BACKGROUND OF THE INVENTION

The present invention relates to a linear actuator and a manufacturing method for such a linear actuator.

Linear actuators often include a mechanism for converting a rotational motion, e.g. of a motor shaft, into a translational or "linear" motion. In the art, several of such mechanisms are known, which range from simple screw-nut configurations to ball screws and (planetary) roller screws.

Such linear actuators are e.g. used for translating machine parts. A particular field of use is vehicles such as trains or aircrafts. Linear actuators may be used to move e.g. flaps, landing gear, or rudders.

However, in many of these applications, weight and space requirements are challenging. For example, to activate flaps in aircraft wings, the corresponding actuator must fit into the wing. Additionally, the actuator high must be able to handle high (axial) loads. These requirements may be fulfilled by inverted roller screw mechanisms. Those mechanisms can be realized in a very compact manner and allow for a very precise and yet fast linear motion.

SUMMARY OF THE INVENTION

It is accordingly an object of the invention to provide an improved linear actuator and manufacturing method, which overcome the hereinafore-mentioned disadvantages of the heretofore-known linear actuators and methods of this general type and in which the linear actuator is, in particular light-weight and/or compact.

With the foregoing and other objects in view there is provided, in accordance with a first aspect of the invention, a linear actuator which comprises a roller screw nut, a roller screw shaft and a plurality of planetary rollers forming an inverted roller screw mechanism. According to the invention, a bearing supporting a rotating part of the linear actuator is provided. The bearing includes a mounting member and a plurality of grooved bearing rollers engaging a first bearing portion of the mounting member and a second bearing portion of the rotating part. The plurality of grooved bearing rollers is axially fixed therein relative to the rotating part and the mounting member.

Preferred embodiments of the invention are the subject of the dependent claims and the following description.

An aspect of the invention is based on the approach to support a rotating part of a linear actuator, e.g. a roller screw nut, with a bearing including a plurality of, preferably elongated, grooved bearing rollers. To this end, the rotating part advantageously includes a second bearing portion which can be engaged by the plurality of grooved bearing rollers. Further, the bearing advantageously includes a mounting member having a first bearing portion which may be engaged by the plurality of grooved bearing rollers as well. By supporting the rotating part of the linear actuator with a plurality of grooved bearing rollers, high loads can be transferred. Yet, in contrast to conventional bearings, e.g. thrust bearings such as angular contact ball bearings, the space required for achieving the same load capacity can be reduced significantly.

For example, each of the plurality of bearing rollers may provide multiple contact points both for the rotating part in the second bearing portion and for the mounting member in the first bearing portion. In order to achieve the same number of contact points with angular contact ball bearings, an according number of balls has to be used. However, this large number requires an increased amount of space and further accumulates to high weights.

In order to support the rotating part of the actuator, the plurality of bearing rollers are advantageously disposed radially between the rotating part and the mounting member in such a way that they engage the second bearing portion or the first bearing portion, respectively. Preferably, the bearing rollers are radially distributed around the rotating part. In particular, the bearing rollers may be radially distributed around the rotating part in an equidistant manner. Upon rotation of the rotating part, in particular relative to the mounting member, the bearing rollers may roll along a surface of the rotating part in a circumferential direction. Advantageously, the bearing rollers roll in such a manner that they do not move axially, neither relative to the rotating part nor to the mounting member.

Preferred embodiments of the invention and further aspects thereof are described below, each of which, unless expressly excluded, may be combined with each other and with the aspects of the invention described below as desired.

In a preferred embodiment, each bearing roller includes at least one groove forming a threading. The threading preferably meshes with a first threading of the mounting member and a second threading of the rotating part. Advantageously, the first bearing portion includes the first threading and/or the second bearing portion includes the second threading. The threading may facilitate the rolling of the bearing rollers along the surface of the rotating part in the circumferential direction. At the same time, the threading may provide a high number of contact points between the rotating part or the mounting member and each bearing roller, respectively, enabling the transfer of high loads in the axial direction.

In another preferred embodiment, a helix angle of the threadings of the bearing rollers, a helix angle of the first threading and a helix angle of the second threading are equal. In this way, axial movement of the bearing rollers relative to the rotating part or the mounting member, respectively, can be suppressed. In other words, by the equal helix angles, the bearing rollers can be axially fixed without requiring any additional measures. Equal helix angles thus can facilitate a compact and lightweight actuator.

In yet another preferred embodiment, the roller screw nut includes the second bearing portion. In other words, the nut corresponds to the rotating part and is engaged not only by the plurality of planetary rollers, but also by the plurality of bearing rollers. The nut can thus be rotationally mounted through the mounting member to a machine part, e.g. in an aircraft wing, in such a way that upon rotation of the nut, the shaft (linearly) translates.

In yet another preferred embodiment, the second bearing portion axially at least partially overlaps with a third threading of the roller screw nut meshing with the plurality of planetary rollers. For example, the nut includes the third threading on an inner surface. Accordingly, the nut advantageously includes the second bearing portion on an outer surface. Preferably, the third threading axially extends substantially over the whole length of the nut. In contrast, it is preferred that the second bearing portion axially extends only to about the length of one bearing roller. The second bearing portion and the third threading may thus be radially spaced and overlap partially in the axial direction. This allows for an axially short actuator.

In yet another preferred embodiment, the roller screw shaft includes the second bearing portion. In other words, the shaft corresponds to the rotating part and is engaged not only by the plurality of planetary rollers, but also by the plurality of bearing rollers. The shaft can thus be rotationally mounted through the mounting member to a machine part, e.g. installed in an aircraft wing, in such a way that upon rotation of the roller screw shaft, the roller screw nut (linearly) translates.

In yet another preferred embodiment, the mounting member is at least partially hollow and the first bearing portion is disposed on an inner surface of the mounting member, in particular an inner surface of the hollow part. For example, the mounting member may be configured as a bushing. An at least partially hollow mounting member can be disposed around a circumferential outer surface of the rotating part, for example the nut or the shaft. In such an arrangement, the mounting member may be constructed to be particularly thin, thus reducing space requirements and weight.

In yet another preferred embodiment, the second bearing portion is disposed on a circumferential outer surface of the rotating part. For example, the nut may include an inner threading for meshing with a threading of the planetary rollers, and an outer threading for meshing with the threading of the bearing rollers. The second bearing portion being located on an outer surface of the rotating part allows for arrangement of the mounting member around an outer circumference of the rotating part, saving axial space.

In yet another preferred embodiment, the second bearing portion is disposed on an inner surface of the roller screw nut. The bearing rollers may thus be disposed inside the nut. This allows for an actuator having a particularly small cross-section.

In yet another preferred embodiment, the second bearing portion is disposed axially adjacent a threading of the rotating part meshing with the plurality of planetary rollers. In particular, the second portion may directly connect to the threading. For example, the threading for meshing with the planetary rollers may directly connect to the second threading for meshing with the bearing rollers. It is even conceivable that the threading for meshing with the planetary rollers can merge into the threading for meshing with the bearing rollers. In other words, a section of the threading for meshing with the planetary rollers may form the second portion. Adjacently arranging the second bearing portion and the threading on the rotating part may facilitate efficient manufacture.

In yet another preferred embodiment, at least a part of the mounting member axially extends into the roller screw nut. For example, the mounting member may include a shaft portion, wherein the shaft portion axially extends into the nut. Preferably, the bearing rollers are radially disposed between the shaft portion on the inside and the nut on the outside. By this measure, the mounting member may act similar to an axle on which the nut, i.e. the rotating part, is rotatably supported. This allows for a substantially decreased cross section of the linear actuator.

In yet another preferred embodiment, the first bearing portion is disposed on a circumferential outer surface of the mounting member, the outer surface being disposed inside the roller screw nut. Preferably, the mounting member includes a shaft portion, the shaft portion having the first bearing portion disposed thereon. By this measures, a particularly thin actuator having a substantially reduced cross-section can be realized.

In yet another preferred embodiment, the rotating part of the actuator includes a collar having the second bearing portion disposed thereon. Preferably, the collar is integral with the rotating part. I.e., the collar and the rotating part are fabricated from one piece. Alternatively, the collar is mounted to the rotating part. For example, the collar may be clamped onto the rotating part. Preferably, the second bearing portion is disposed on a circumferential outer surface of the collar. Through the use of the collar, the second bearing portion may protrude from the rotating part. This can ease the mounting of the linear actuator to e.g. a machine part, in particular to install the actuator inside an aircraft wing.

In yet another preferred embodiment, the grooves of each bearing roller form respective closed loops separated by a plurality of ridges. The ridges mesh with a plurality of complementary grooves of the mounting member and a plurality of complementary grooves of the rotating part. Advantageously, the first bearing portion includes, in particular is defined by, separate closed grooves of the mounting member, and/or the second bearing portion includes, in particular is defined by, separate closed grooves of the rotating part. Preferably, each of the ridges and/or grooves has an annular shape. In other words, each of the ridges and/or grooves runs perpendicular to the axial direction. The ridges of the bearing rollers may facilitate the rolling of the bearing rollers along the surface of the rotating part in the circumferential direction. In particular, the ridges meshing with the corresponding grooves may prevent axial movement of the bearing rollers when rotating along the surface of the rotating part.

With the objects of the invention in view, there is concomitantly provided a method according to a second aspect, which is used for manufacturing a linear actuator, in particular a linear actuator according to the first aspect of the invention. Therein, a threading of the rotating part for meshing with the plurality of planetary rollers and the second portion of the rotating part for engagement by the plurality of grooved bearing rollers are created in a single process step. For example, the threading of the rotating part for meshing with the planetary rollers and the second threading of the rotating part may be cut into the rotating part in a single process step. In particular, the threadings may be cut into the rotating part successively or at least partially simultaneously. By this measure, the actuator can be manufactured in a particularly efficient and time-saving manner.

A preferred application of the linear actuator according to the first aspect of the invention relates to a flight vehicle, in particular an aircraft or spacecraft. The inventive actuator is particularly suited for the use in flight control due to his high level of compactness, low weight and very long service life. However, it is also possible to use such an actuator in other fields, for example for valve control e.g. in oil and gas applications or for tool positioning e.g. in spot welding or other robotic applications.

The properties, features and advantages of the invention described above, as well as the manner in which they are achieved, will be explained in more detail in connection with the figures in the following description of examples. Where appropriate, the same reference signs are used in the figures for the same or corresponding elements of the invention. The examples serve to explain the invention and do not limit the invention to the combinations of features indicated therein, even with respect to functional features. Moreover, any of the features disclosed in the above description as well as in the examples below may be considered in isolation and suitably combined with the features of any of the above embodiments and their further aspects. In particular, each of the features described above and below may be combined alone or in conjunction with others of the described features with the linear actuator according to the first aspect of the invention and the method according to the second aspect of the invention.

Other features which are considered as characteristic for the invention are set forth in the appended claims.

Although the invention is illustrated and described herein as embodied in a linear actuator and a manufacturing method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
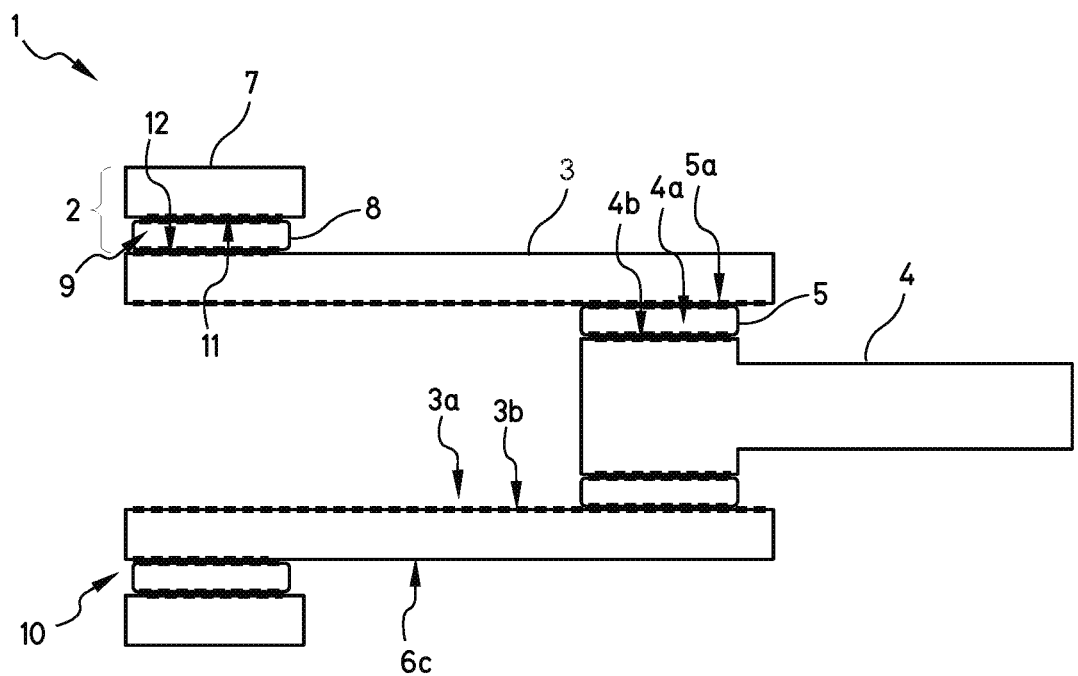
FIG. 1 is a diagrammatic, elevational view of an example of a linear actuator including an outer bearing for rotationally supporting a roller screw nut.

Referring now to the figures of the drawings in detail and first, particularly, to FIG. 1 thereof, there is seen an example of a linear actuator 1 including an outer bearing 2 for rotationally supporting a roller screw nut 3. The actuator 1 further includes a roller screw shaft 4 and a plurality of planetary rollers 5 disposed radially between the nut 3 and a shaft 4. The nut 3, the shaft 4 and the plurality of planetary rollers 5 form an inverted planetary roller screw mechanism.

In the example shown in FIG. 1, the nut 3 corresponds to a rotating part 6 of the actuator 1. That means that during operation, the nut 3 rotates not only relative to the shaft 4, but also to a mounting member 7 of the bearing 2. Preferably, the actuator 1 is mounted to an external machine part by the mounting member 7. For example, the actuator 1 may be installed inside an airplane wing by the mounting member 7. Advantageously, the mounting member 7 may thereby be rotationally fixed relative to the surroundings of the actuator 1 in such a way that the bearing 2 can rotationally support the rotating part 6. The rotating part 6 may thus rotate relative to the surroundings of the actuator 1 in an installed state of the actuator 1.

Upon rotation of the nut 3, the planetary rollers 5 travel along an inner circumferential surface 3a of the nut 3 in the axial direction. To this end, the nut 3 includes a third threading 3b disposed on the inner surface 3a which meshes with an outer threading 5a of the planetary rollers 5. The threading 5a of the planetary rollers 5 also meshes with a fourth threading 4b of the shaft 4, the fourth threading 4b being disposed on an outer circumferential surface 4a of the shaft 4.

The threading 5a of the planetary rollers 5, the third threading 3b of the nut 3 and the fourth threading 4b of the shaft 4 are configured in such a way that the planetary rollers 5 are axially fixed with respect to the shaft 4. That means that upon rotation, the planetary rollers 5 do not move along the outer surface 4a of the shaft 4, i.e. in an axial direction. This is preferably achieved by providing an equal helix angle of the fourth threading 4b and the threading 5a of the planetary rollers 5. In contrast, the helix angle of the third threading 3b differs from the helix angle of the threading 5a of the planetary rollers 5, facilitating the axial movement upon rotation of the nut 3 relative to the shaft 4.

In order to rotatably support the rotating part 6, i.e. the nut 3, the bearing 2 includes a plurality of grooved bearing rollers 8. The bearing rollers 8 are disposed and/or configured for engaging a first bearing portion 9 of the mounting member 7 and a second bearing portion 10 of the rotating part 6.

Preferably, the grooved bearing rollers 8 are disposed parallel to an axis of rotation of the rotating part 6 and/or a symmetry axis of the mounting member 7.

Upon rotation of the rotating part, i.e. the nut 3, the bearing rollers 8 travel alongside an outer surface 3c of the rotating part 6 in a circumferential direction, thereby facilitating low friction. In other words, the bearing rollers 8 are configured to circle the rotating part 6 in a planetary manner.

The bearing rollers 8 are axially fixed relative to the mounting member 7 and the rotating part 6. That means that during operation of the actuator 1, i.e. upon rotation of the rotating part 6, the bearing rollers 8 do not move in the axial direction.

To this end, in the present example, each bearing roller 8 includes an outer threading meshing with a first threading 11 of the mounting member 7 and a second threading 12 of the rotating part 6. Advantageously, the threading of each bearing roller 8 is formed by a helical groove. Preferably, the first bearing portion 9 is defined by the first threading 11, and/or the second bearing portion 10 is defined by the second threading 12. The axial movement of the bearing rollers 8 relative to the rotating part 6 and the mounting member 7 is suppressed by providing an equal helix angle for the threading of the bearing rollers 8, the first threading 11 and the second threading 12.

In the present example, the mounting member 7 is hollow. Accordingly, the first threading 11 is preferably disposed on an inner surface of the mounting member 7. The second threading 12 is accordingly preferred to be disposed on an outer surface of the rotating part 6. This configuration has the advantage that the actuator 1 may be constructed in a very compact manner. In particular, less space in the radial direction is required compared to actuators including conventional thrust bearings.

In other words, by using the bearing 2 including the bearing rollers 8 for supporting the rotating part 6, in particular the nut 3, the cross section of the actuator 1 can be reduced. That is because the second bearing portion 10, in particular the second threading 12, is disposed on the outer surface 3c of the rotating part 6, i.e. the nut 3, while the third threading 3b of the nut 3 is disposed on the inner surface 3a, the second bearing portion 10 may at least partially overlap the third threading 3b in the axial direction. In this way, the axial length of the actuator 1 may be minimized.

Figure 2:
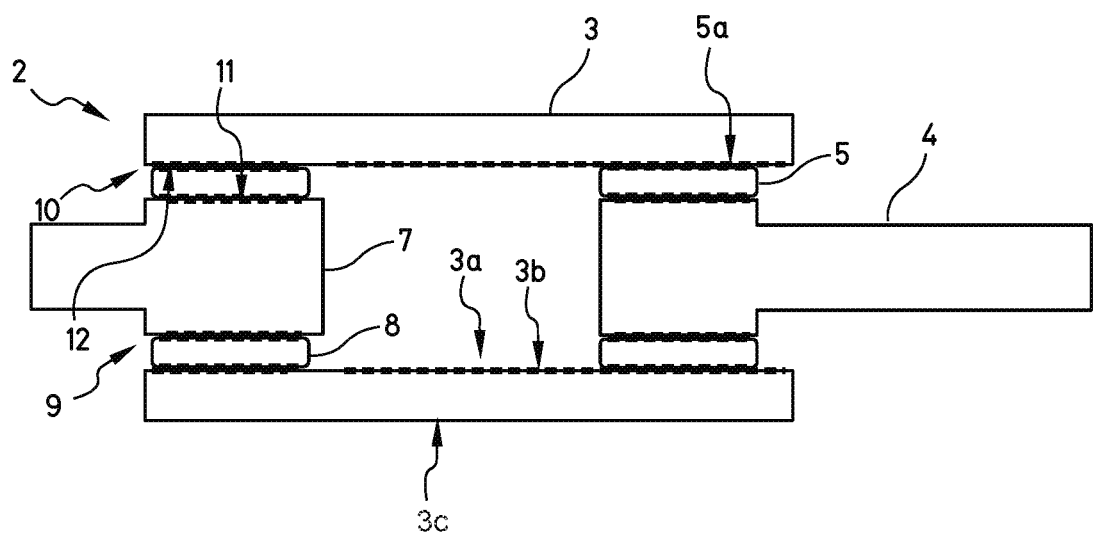
FIG. 2 is a view similar to FIG. 1 of an example of a linear actuator including an inner bearing for rotationally supporting a roller screw nut.

FIG. 2 shows an example of a linear actuator 1 including an inner bearing 2 for rotationally supporting a roller screw nut 3. Similar to the example shown in FIG. 1, the nut 3 together with a plurality of planetary rollers 5 and a roller screw shaft 4 forms an inverted roller screw mechanism, wherein the nut 3 corresponds to a rotating part 6 of the actuator 1. The bearing 2 includes a mounting member 7 and a plurality of grooved bearing rollers 8 disposed radially between the mounting member 7 and the rotating part 6 in such a way that they engage a first bearing portion 9 of the mounting member 7 and a second bearing portion 10 of the rotating part 6.

The example shown in FIG. 2 differs from the example of FIG. 1 in that the second bearing portion 10 is disposed on an inner surface 3a of the nut 3. Accordingly, the plurality of bearing rollers 8 are disposed inside the nut 3.

To this end, the mounting member 7 is preferably constructed to be shaft-shaped. In particular, the mounting member 7 may include a shaft portion. Advantageously, the mounting member 7, particularly the shaft portion, partially extends into the nut 3. Further preferably, a first bearing portion 9 is disposed on an outer circumferential surface of the mounting member 7, in particular of the portion of the mounting member 7 disposed inside the nut 3.

This configuration of the actuator 1 has the advantage that the cross section can be reduced even further. In particular, an outer diameter of the nut 3, i.e. an outer circumferential surface 3c of the rotating part, may define the largest cross-section of the actuator 1. Accordingly, the actuator 1 can easily fit into tight spaces, for example the inside of an aircraft wing.

Preferably, the second bearing portion 10 is axially adjacent a third threading 3b of the nut 3, the third threading 3b being provided for meshing with a threading 5a of the planetary rollers 5. Although not shown in the example, it is conceivable that the planetary rollers 5 and the bearing rollers 8 share the same threading. In other words, the third threading 3b may correspond to the second threading 12. This may significantly reduce manufacturing effort. In particular, the second and third threadings 12, 3b may be created in a single process step.

Figure 3:
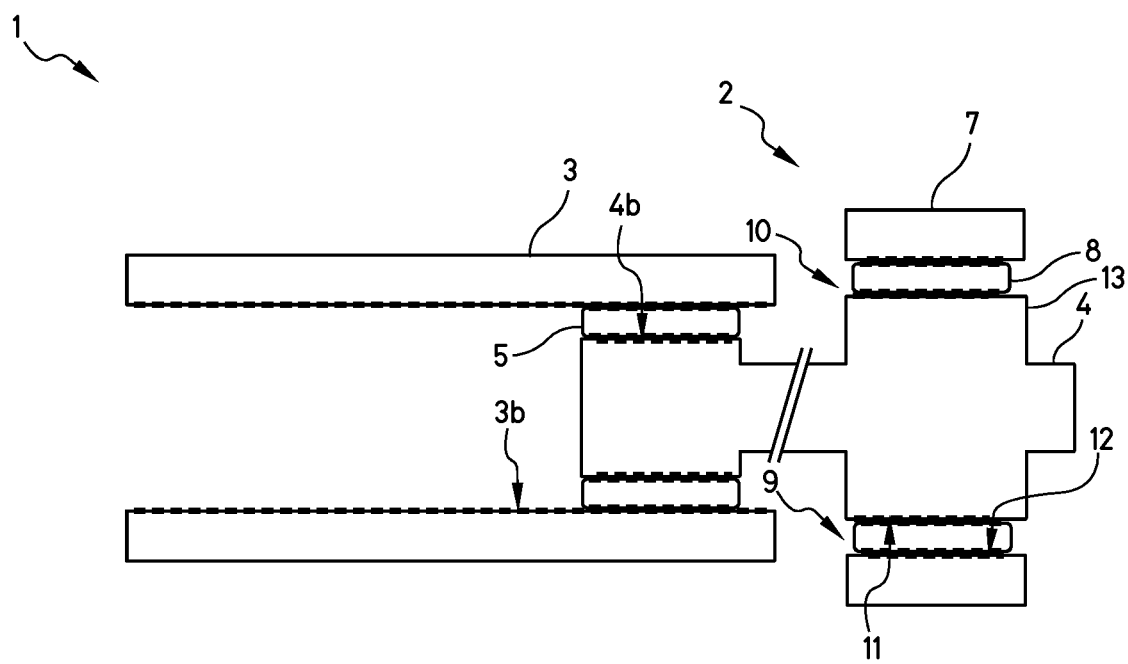
FIG. 3 is a view similar to FIGS. 1 and 2 of an example of a linear actuator including an outer bearing for rotationally supporting a roller screw shaft.

FIG. 3 shows an example of a linear actuator 1 including an outer bearing 2 for rotationally supporting a roller screw shaft 4. Similar to the example shown in FIG. 1, the shaft 4 is part of an inverted roller screw mechanism in which a plurality of planetary rollers 5 engage a fourth threading 4b of the shaft 4 and a third threading 3b of a roller screw nut 3.

The example shown in FIG. 3 differs from the example of FIG. 1 in that the shaft 4 corresponds to a rotating part 6 of the actuator 1 instead of the nut 3. In other words, the shaft 4 is advantageously supported rotatably relative to the surroundings of the actuator 1. To this end, the bearing 2 includes a mounting member 7 and a plurality of bearing rollers 8 engaging the mounting member 7 in a first bearing portion 9. The bearing rollers 8 further engage the rotating part, i.e. the shaft 4, in a second bearing portion 10.

The bearing rollers 8 are axially fixed relative to the rotating part 6, i.e. to the shaft 4, and to the mounting member 7.

Accordingly, in the present example, upon rotation of the shaft 4, the nut 3 translates in the axial direction relative to the mounting member 7.

Preferably, the shaft 4, i.e. the rotating part 6, includes a collar 13, wherein the second bearing portion 10 is disposed on an outer circumferential surface of the collar 13. This allows the mounting member 7 to have a larger diameter. In particular, in this way, the mounting member 7 may protrude radially from the nut 3. In other words, the mounting member 7 may define the largest cross-section of the actuator 1. The actuator 1 can accordingly be mounted by the mounting member 7 without the nut 3 interfering.

In another variant of the actuator 1, the collar 13 is dimensioned in such a way that the mounting member 7 does not protrude radially from the nut 3. In particular, the collar 13 including the mounting member 7 may be integrated into an actuator end interface (not shown).

The collar 13 may be integral with the shaft 4. I.e. the shaft 4 and the collar 13 may be manufactured in one piece. Alternatively, the collar may be attached to the shaft 4, for instance by clamping. In this way, the actuator 1 can be easily adapted to different environments. In yet another alternative, the shaft 4 can be replaced by a corresponding female interface.

The following is a summary list of reference numerals and the corresponding structure used in the above description of the invention.

LIST OF REFERENCE SIGNS 1 linear actuator
2 bearing
3 roller screw nut
3a inner surface
3b third threading
3c outer surface
4 roller screw shaft
4a outer surface
4b fourth threading
5 planetary roller
5a planetary roller threading
7 mounting member
8 bearing roller
9 first portion
10 second portion
11 first threading
12 second threading
13 collar

The invention claimed is:

1. A linear actuator, comprising:
a roller screw nut, a roller screw shaft and a plurality of planetary rollers forming an inverted roller screw mechanism, said roller screw nut or said roller screw shaft forming a rotating part of the linear actuator; and
a bearing supporting said rotating part, said bearing including a mounting member and a plurality of grooved bearing rollers, said mounting member having a first bearing portion;
said plurality of grooved bearing rollers engaging said first bearing portion and a second bearing portion of said rotating part, and said plurality of grooved bearing rollers being axially fixed relative to said rotating part and said mounting member.

2. The linear actuator according to claim 1, wherein said mounting member has a first threading, said rotating part has a second threading, and each bearing roller of said plurality of grooved bearing rollers includes at least one groove forming a threading meshing with said first threading and said second threading.

3. The linear actuator according to claim 2, wherein said threadings of said bearing rollers, said first threading and said second threading each have a helix angle being equal.

4. The linear actuator according to claim 1, wherein said roller screw nut forms said rotating part and includes said second bearing portion.

5. The linear actuator according to claim 2, wherein said roller screw nut has a third threading meshing with said plurality of planetary rollers, and said second bearing portion at least partially overlaps axially with said third threading.

6. The linear actuator according to claim 1, wherein said roller screw shaft forms said rotating part and includes said second bearing portion.

7. The linear actuator according to claim 1, wherein said mounting member is at least partially hollow, said mounting member has an inner surface, and said first bearing portion is disposed on said inner surface of said mounting member.

8. The linear actuator according to claim 1, wherein said rotating part has a circumferential outer surface, and said second bearing portion is disposed on said circumferential outer surface.

9. The linear actuator according to claim 1, wherein said roller screw nut has an inner surface, and said second bearing portion is disposed on said inner surface.

10. The linear actuator according to claim 1, wherein said rotating part has a threading meshing with said plurality of planetary rollers, and said second bearing portion is disposed axially adjacent said threading.

11. The linear actuator according to claim 1, wherein at least a part of said mounting member axially extends into said roller screw nut.

12. The linear actuator according to claim 9, wherein at least a part of said mounting member axially extends into said roller screw nut.

13. The linear actuator according to claim 1, wherein said mounting member has a circumferential outer surface disposed inside said roller screw nut, and said first bearing portion is disposed on said circumferential outer surface of said mounting member.

14. The linear actuator according to claim 9, wherein said mounting member has a circumferential outer surface disposed inside said roller screw nut, and said first bearing portion is disposed on said circumferential outer surface of said mounting member.

15. The linear actuator according to claim 1, wherein said rotating part includes a collar, and said second bearing portion is disposed on said collar.

16. The linear actuator according to claim 1, wherein each bearing roller of said plurality of grooved bearing rollers has grooves forming respective closed loops separated by a plurality of ridges, said mounting member and said rotating part each have a plurality of complementary grooves, and said plurality of ridges mesh with said plurality of complementary grooves of said mounting member and said rotating part.

17. A method for manufacturing a linear actuator, the method comprising:
providing the linear actuator according to claim 1 by carrying out a single process step for creating a threading of said rotating part for meshing with said plurality of planetary rollers and for creating said second portion of said rotating part for engagement by said plurality of grooved bearing rollers.

* * * * *